(12) United States Patent
Osada et al.

(10) Patent No.: US 7,201,263 B2
(45) Date of Patent: Apr. 10, 2007

(54) VISCOUS DAMPER

(75) Inventors: Kunihiro Osada, Saitama (JP); Masahiko Nakatsuka, Saitama (JP); Akira Sonobata, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 120 days.

(21) Appl. No.: 10/941,957

(22) Filed: Sep. 16, 2004

(65) Prior Publication Data

US 2005/0087421 A1 Apr. 28, 2005

(30) Foreign Application Priority Data

Sep. 25, 2003 (JP) .............................. 2003-333326

(51) Int. Cl.
*F15F 15/16* (2006.01)
*F16D 35/00* (2006.01)

(52) U.S. Cl. ................................. 192/58.41; 192/30 V

(58) Field of Classification Search ............... 192/58.4, 192/58.41
See application file for complete search history.

(56) References Cited

U.S. PATENT DOCUMENTS

| | | | | |
|---|---|---|---|---|
| 3,667,214 A | * | 6/1972 | Addie | .......................... 60/608 |
| 4,257,370 A | * | 3/1981 | Kasting | .................. 123/198 E |
| 4,838,107 A | * | 6/1989 | Herrmann | ..................... 74/411 |
| 5,419,417 A | * | 5/1995 | Madsack | ................... 192/58.4 |
| 6,026,776 A | * | 2/2000 | Winberg | .................. 123/192.1 |
| 6,308,678 B1 | * | 10/2001 | Haas et al. | .............. 123/192.1 |
| 6,789,522 B2 | * | 9/2004 | Seymour | ................ 123/198 R |
| 2003/0089822 A1 | * | 5/2003 | Koch et al. | .................... 244/60 |

FOREIGN PATENT DOCUMENTS

EP 1211398 A1 6/2002
JP 3206977 B2 7/2001

* cited by examiner

*Primary Examiner*—Richard M. Lorence
(74) *Attorney, Agent, or Firm*—Birch, Stewart, Kolasch & Birch, LLP

(57) ABSTRACT

A viscous damper for driving accessories by a crankshaft though a viscous coupler of the viscous damper. The rotational driving force of the crankshaft is transmitted to the viscous damper hub through the meshing of a large diameter gear and a driven gear, the viscous damper forming a unit with the driven gear. The rotational driving force is further transmitted to a viscous damper housing through the hub and the viscous coupler, i.e., the viscous coupler including a number of plates which are movable relative to each other in a space filled with silicon oil. The rotational driving force, which is transmitted to the housing and is dampened in torque changes by the function of the coupler, is transmitted to a rotor shaft of an alternator to smoothly rotate the alternator rotor. A smooth performance in driving the accessories is ensured by the viscous damper having the viscous coupler.

17 Claims, 7 Drawing Sheets

VISCOUS DAMPER

CROSS-REFERENCE TO RELATED APPLICATION

The present application is related to Japanese Patent Application No. 2003-333326, filed on Sep. 25, 2003, the entire contents of which are hereby incorporated by reference.

BACKGROUND OF THE INVENTION

1. Field of the Invention

The present invention relates to a viscous damper, and more particularly to a viscous damper which is used as a damper in a power transmission device that drives accessories such as an alternator and the like by means of a gearing directly coupled with a crankshaft through the damper.

2. Description of Background Art

For a power transmission device in conventional vehicles, a power transmission device using a viscous damper has been well known. An example is a power transmission device having a construction in which the rotational driving force of a first flywheel directly connected to a crankshaft is transmitted to a second flywheel via a torsion spring and a viscous damper, and the rotational driving force transmitted to the second flywheel is transmitted to an output shaft via a clutch coupling. In this power transmission device, when a relative vibration between the two flywheels is relatively stable and small in amplitude in a high rotational speed range, the torque is transmitted primarily by the torsion spring. When the relative vibration between the two flywheels is large in amplitude, that is, when a relative torsional vibration with relatively large amplitude is generated between the first flywheel and the second flywheel in a low rotational speed range at or below an idling speed, the viscous damper works to dampen and absorb the torsional vibration and to accomplish a smooth power transmission of the rotational driving force, which consequently reduces the vehicle body vibration at the low rotational speed range (See for example Japanese Patent Publication No. 3,206,997 (Page 4, FIG. 1, FIG. 6).

A power transmission device having a viscous damper described in the invention disclosed in Japanese Patent Publication No. 3,206,997 is configured as follows. As shown in FIGS. 7(a) and 7(b), to a first flywheel 02 which is directly connected to the crankshaft 01 of an internal combustion engine, a second flywheel 03 is coupled with a torsion spring 04 which is a first damper means and a viscous coupling 07 interposed inbetween. The rotational driving force of the crankshaft 01 transmitted to the second flywheel 02 is transmitted to an output shaft 06 via the coupling operation of a clutch 05.

For the torsion spring 04 in the viscous damper, an elastic member such as a coil spring and the like is used. The viscous coupling 07 comprises multiple driving side plates 08, driven side plates 09, and floating plates 011 which are alternately arranged in a coupling space 010 filled with a viscous fluid. The viscous torque on account of a relative movement of these plates with the viscous fluid acting therebetween dampens and absorbs the vibration energy due to the rotational driving force.

With the viscous damper in this power transmission device, the driving force is transmitted between the two flywheels via the torsion spring which is the first damper means when the relative vibration between the two flywheels of the first flywheel and the second flywheel is relatively stable and small in amplitude in a high speed rotational speed range. When the relative vibration between the two flywheels of the first flywheel and the second flywheel is relatively large in amplitude, that is, when a torsional vibration with large amplitude is generated between the both wheels in a low rotational speed range at or below an idling speed, the viscous coupling which is the second damper means works to dampen and absorb the torsional vibration and to suppress the vibration in the power transmission device in a low speed rotational speed range, which consequently reduces the vehicle body vibration and noise.

However, for the viscous damper in the aforesaid power transmission device, the damper constitution uses the following two means together; an elastic member such as a torsion spring is used as the first damper means, and a viscous fluid is used as the second damper means. In a viscous damper of such a construction, an occurrence of resonance phenomena by the torsion spring or the elastic member as the first damper means is unavoidable. The occurrence of resonance phenomena causes new vibration and noise in the viscous damper or the power transmission device using the viscous damper, resulting in a failure to accomplish a sufficient suppression of vibration and noise in the viscous damper or the power transmission device. Further, the presence of a plurality of sources causing vibration and noise in the power transmission device using such a viscous damper increases the difficulty in designing the power transmission device because the vibration and noise sources are affecting each other in a complex manner.

Under afore-described circumstances, with regard to a power transmission device for driving accessories by the crankshaft, on the premise that pulsating rotational torque changes which are transmitted from the crankshaft to the accessories through the power transmission device are effectively dampens and absorbs, and the smooth driving of the accessories is ensured, a simplified structure of the power transmission device is maintained by interposing a simplified viscous damper in the power transmission device. Incidentally, a provision of an improved structure for the viscous damper, which is used in the power transmission device for driving accessories, and is capable of effectively dampening and absorbing rotational torque changes from the crankshaft has been desired.

SUMMARY AND OBJECTS OF THE INVENTION

The present invention relates to an improved structure for a viscous damper used in a power transmission device for driving accessories to solve afore-described problems. In a viscous damper used in a power transmission device for transmitting the rotational driving force of a crankshaft of an internal combustion engine to the accessories, the viscous damper comprises a viscous coupling means interposed between the crankshaft and the accessories, and transmits the rotational driving force of the crankshaft to the accessories via a viscous fluid in the viscous coupling means. Incidentally, the viscous coupling means which constitutes the viscous damper is arranged inside the body of the internal combustion engine.

Additionally, gears are arranged between the crankshaft and the viscous coupling means which constitutes the viscous damper. The viscous damper composed of the viscous coupling means comprise a housing for transmitting the rotational driving force to the accessories and a hub which is arranged on the inner periphery side to transmit the rotational driving force from the crankshaft. The housing is provided with a weight section which is an annular protrusion axially extending near housing outer periphery. The housing which serves to transmit the rotational driving force to the accessories rotates along with the accessories in a direction opposite to the crankshaft rotation.

According to a first aspect of the invention, a viscous damper is used in a power transmission device for transmitting the rotational driving force of a crankshaft of an internal combustion engine to the accessories. The viscous damper is composed of a viscous coupling means arranged between the crankshaft and accessories. Since the viscous damper transmits the rotational driving force of the crankshaft to the accessories via a viscous fluid in the viscous coupling means, a resonant phenomena from the viscous damper does not occur, which reduces sources causing vibration and noise in the power transmission device for driving accessories, and the designing of the power transmission device is facilitated. Also, since the viscous damper does not need a spring member such as a torsion spring, the number of its component parts is reduced, its structure is simplified, and, as a result, the structure of the power transmission device for driving accessories using the viscous damper is simplified.

According to a second aspect of the invention, the viscous coupling means that constitutes the viscous damper is disposed inside the body of an internal combustion engine, and accordingly the lubrication of the viscous damper can be accomplished by making use of the engine oil. Therefore, there is no need to provide a separate lubrication device for the viscous damper. Further, since the engine oil works to cool the damper, and the interior space of the internal combustion engine is hard to be affected by the outside air temperature, changes in the damper performance due to the temperature can be controlled. Therefore, as a consequence of using the viscous damper, the power transmission device for driving accessories which affords good damping and absorbing effects for vibration and noise can be provided.

According to a third aspect of the invention, a gearing is interposed between the crankshaft and the viscous coupling means which constitutes the viscous damper, and the viscous damper composed of the viscous coupling means comprises a housing which transmits the rotational force to the accessories and a hub which is arranged on the inner periphery side of the housing to transmit the rotational driving force from the crankshaft. Therefore, its structure can be simplified.

Further, since the load acting on the gearing between the crankshaft and the viscous damper is reduced, damages to the gearing can be avoided, and the gear noise can be reduced. As a result, in addition to the vibration and noise damping and absorbing effects, the power transmission device for driving accessories which affords a stable power transmission with a relatively simple structure can be provided.

According to a fourth aspect of the invention, the housing is provided with a weight section which is an annular protrusion axially extending near housing outer periphery. The housing which serves to transmit the rotational driving force to the accessories rotates along with the accessories in a direction opposite to the crankshaft rotation. Therefore, torque changes by the rotational driving force of the crankshaft can be cancelled out and controlled on account of the counter rotation of the accessories and the housing. As a result, by the use of the viscous damper, the power transmission device for driving accessories which affords good damping and absorbing effects for vibration and noise can be provided.

However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A viscous damper is suitably implemented in a power transmission device for driving the alternator by the crankshaft of an internal combustion engine in a motorcycle.

Embodiments according to the present invention will be described with reference to FIG. 1 through FIGS. 6($a$) and ($b$). First, a motorcycle A comprising a power transmission device for driving accessories in which a viscous damper according to the present invention is used and an internal combustion engine E mounted on the motorcycle A will be outlined.

Figure 1:
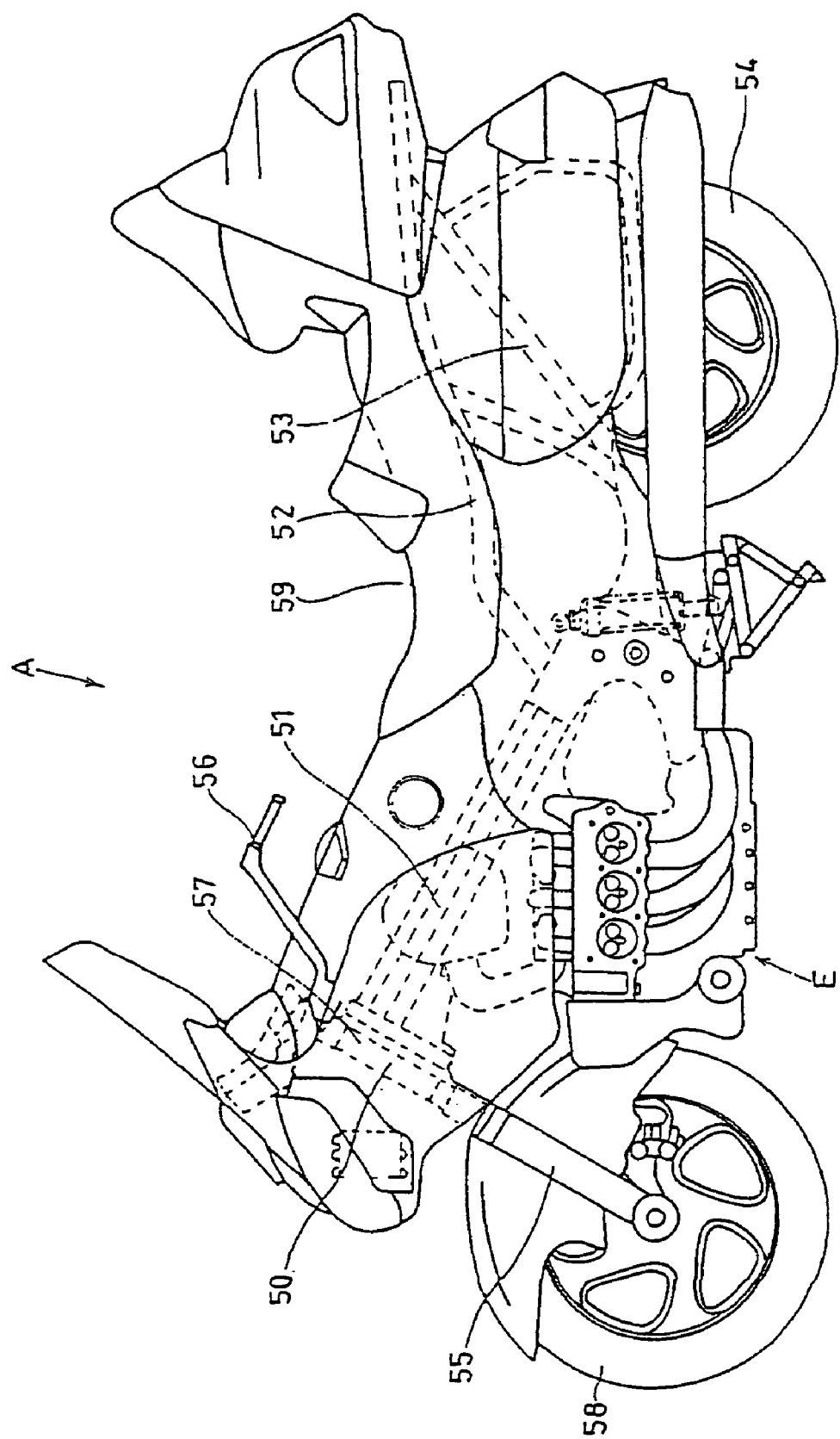
FIG. 1 illustrates a motorcycle using the accessory driving device according to the present invention.

As shown in FIG. 1, the motorcycle according to the present invention comprises a head pipe 50 and a main frame 51 which is connected to the head pipe 50 at one end and extends downwardly at a slanting angle from the head pipe 50. Near the rear end of the main frame 51, a seat rail 52 extending therefrom slightly upwardly and rearwardly is attached. Further, at the rear end of the main frame 51, a back stay 53 extends therefrom upwardly and rearwardly, and, the rear end of the back stay 53 is connected to a rear portion of the seat rail 52.

At the rear end of the main frame 51, the front end of a swing arm (rear fork), not shown, is pivotally supported. The swing arm supports at its rear portion a rear wheel 54 which is a driving wheel for the motorcycle.

The head pipe 50 has a front fork 55 attached to its lower portion, and has a steering shaft 57 attached to its upper portion, the steering shaft 57 being connected with a handle bar 56. The front fork 55 rotatably supports a front wheel 58. An internal combustion engine E is mounted in a space under the main frame 51 through hanger members which are not clearly illustrated. Further, a seat member 59 for riders is fitted onto the seat rail 52 behind the main frame 51.

Figure 2:
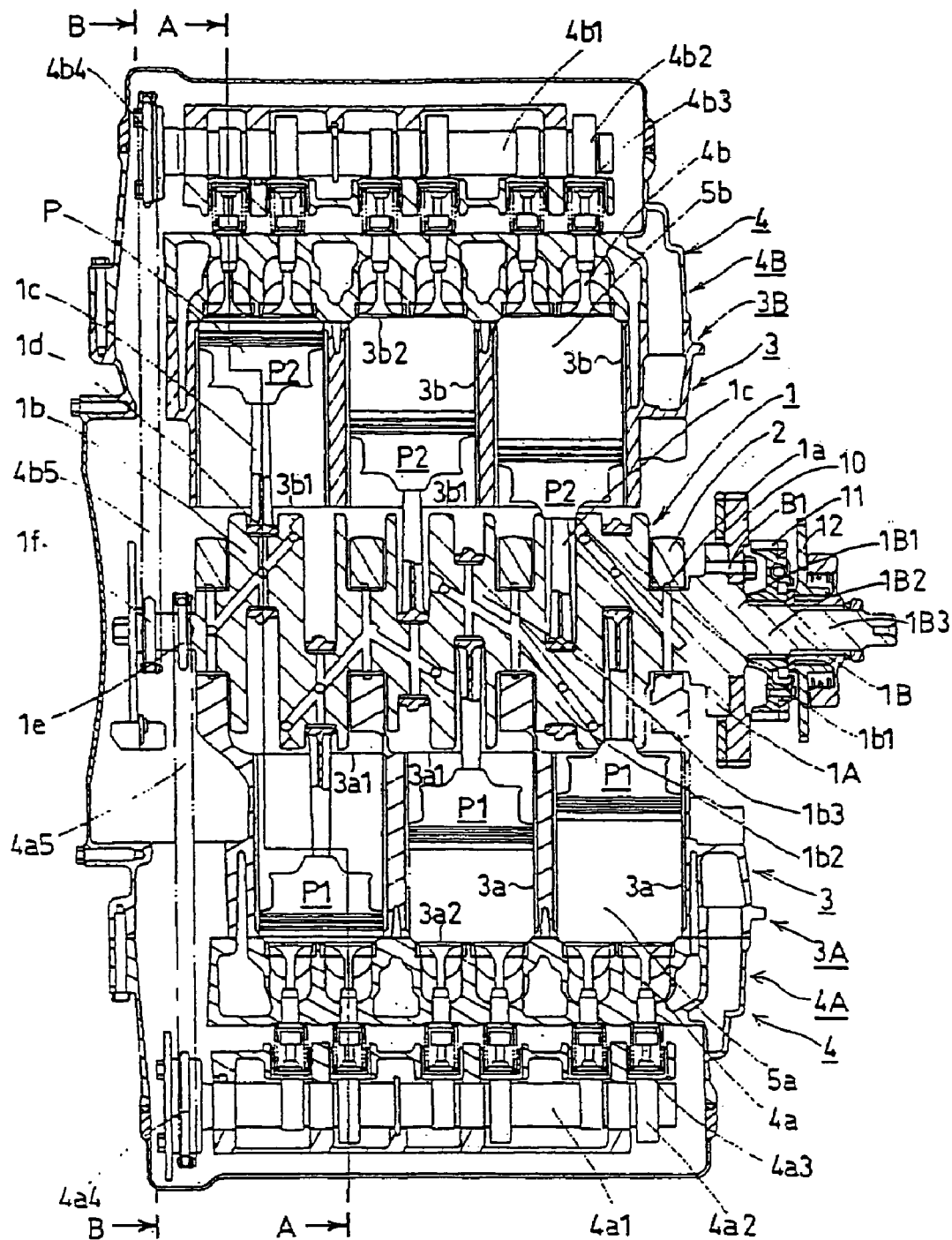
FIG. 2 is a transverse sectional view of an internal combustion engine mounted on a motorcycle according to the present invention.

The internal combustion engine E mounted on the motorcycle A having the frame construction outlined in the above is a horizontally opposed, four-stroke cycle, six cylinder engine as shown in FIG. 1 and FIG. 2 and is mounted on the motorcycle by being hung through a plurality of hanger members in a space under the main frame 51 with the axis of its crankshaft 1 oriented in the fore-to-aft direction of the motorcycle.

In a horizontal sectional view shown in FIG. 2, the internal combustion engine E has a construction in which the crankshaft 1 is located approximately in its center. The crankshaft 1 is rotatably supported in a crankcase 2 through journal bearings 1a at four locations. Each of six crank pins 1b of the crankshaft 1 rotatably supports a connecting rod 1c through its large end 1d. The small end, not shown, of each of the connecting rods 1c is connected with a piston P through a piston pin.

The pistons P are arranged such that respectively three of them are located on either side in a horizontally opposed arrangement (vertically opposed arrangement in FIG. 2) across the crankshaft 1. The right-most No. 1 pin 1b1 of the six crank pins 1b of the crankshaft 1 in FIG. 2 has attached to it a piston P1 depicted in the lower part of FIG. 2 through a connecting rod 1c, and the No. 2 pin 1b2 has attached to it a piston P2 depicted in the upper part of FIG. 2 through a connecting rod 1c. The sequential arrangement similarly goes on in such a manner that the No. 3 pin 1b3 in the lower part . . . , and the No. 4 pin . . . , to complete the opposed arrangement.

Figure 3:
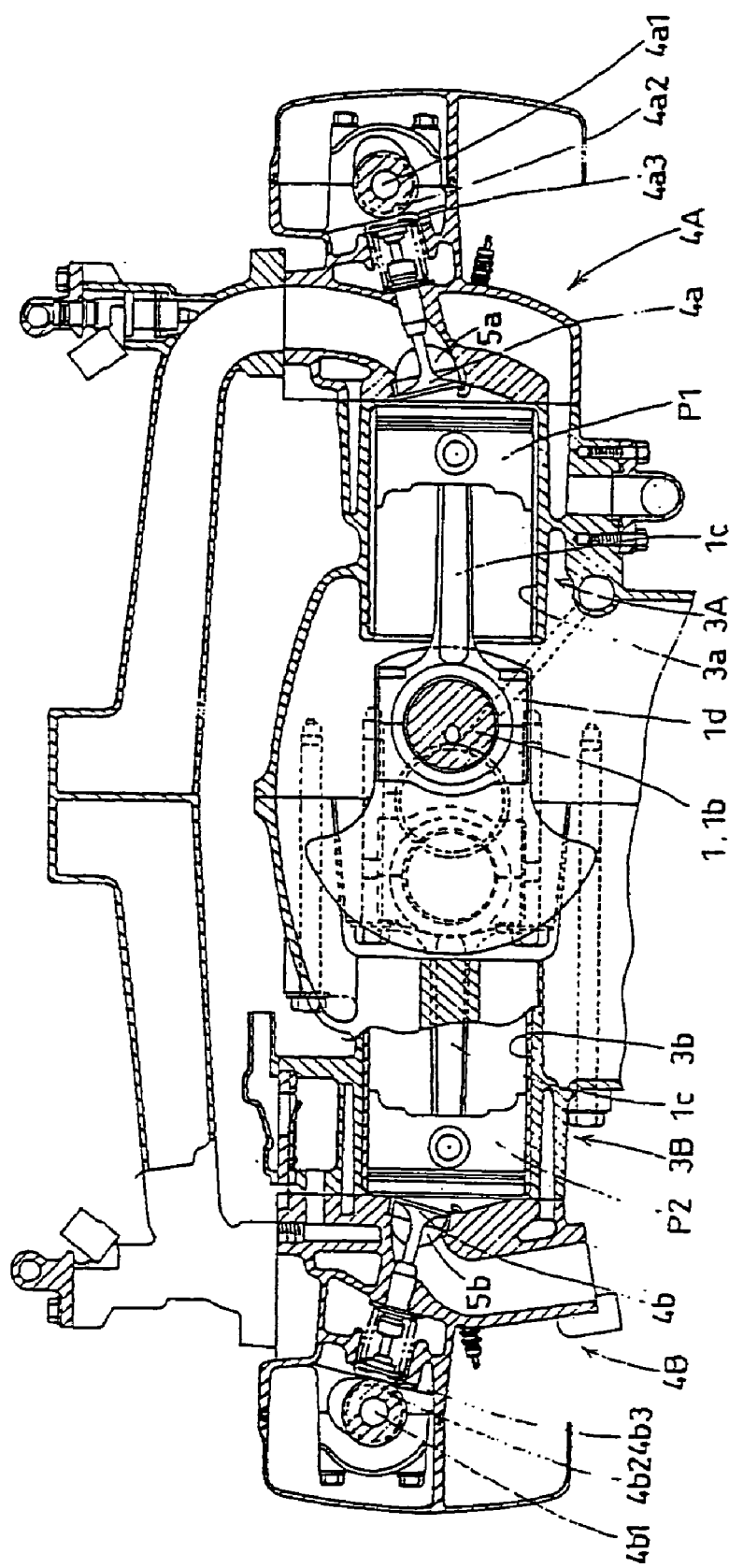
FIG. 3 is a vertical sectional view of an internal combustion engine according to the present invention, and is a sectional view taken along the A—A line in FIG. 2.

In the horizontally opposed arrangement of the pistons P1, P2 across the crankshaft 1, the pistons P1, P2 are arranged, as shown in FIG. 3, to diametrically oppose with each other across the crankshaft 1, that is, to face with each other at an approximately 180 degrees counter-directional orientation. In order to accommodate the horizontally opposed pistons P1, P2, the internal combustion engine E comprises cylinder blocks 3 and cylinder heads 4 in the horizontally opposed arrangement, which is depicted as a vertically opposed arrangement in FIG. 2.

The two horizontally opposed cylinder blocks 3A, 3B are respectively provided with three cylinder bores 3a, 3b for the pistons P. The cylinder bores 3a, 3b are arranged to face with each other at an approximately 180 degrees counter-directional orientation across the crankshaft 1, as shown in FIG. 2 and FIG. 3, so as to allow the sliding reciprocation of the pistons P1, P2 in the bores 3a, 3b. The cylinder bores 3a, 3b essentially have inboard openings 3a1, 3b1 on the crankshaft 1 side, crankshaft 1, and outboard openings 3a2, 3b2 and run through the cylinder blocks 3A, 3B.

Combustion chambers 5a, 5b are formed between the outboard openings 3a2, 3b2 of the respective cylinder bores 3a, 3b in the two cylinder blocks 3A, 3B disposed in the horizontally opposed arrangement and spaces in the inner portions of the cylinder heads 4A, 4B, whose portions serve to join the cylinder heads 4A, 4B. The combustion chambers 5a, 5b are formed with openings for intake and exhaust. These openings are provided with intake and exhaust valve 4a, 4b for opening and closing the openings. An ignition plug, not shown, is fitted to the combustion chamber 5a, 5b.

Further, as shown in FIG. 2 and FIG. 3, camshafts 4a1, 4b1 for opening and closing the intake and exhaust valves 4a, 4b are rotatably supported on the side forming the respective combustion chambers 5a, 5b in the two cylinder heads 4A, 4B and the outboard side opposite to the combustion chamber forming side.

Each of a plurality of cams 4a2, 4b2 on the two camshafts 4a1, 4b1 contacts each of tappets 4a3, 4b3 of the respective valve devices 4a, 4b. As shown in FIG. 2, the camshafts 4a1, 4b1 are respectively fitted with sprockets 4a4, 4b4 for driving the camshafts 4a1, 4b1 at the left-hand end of the camshafts 4a1, 4b1 in the drawing, and each of the sprockets 4a4, 4b4 is interlocked with a different one of two sprockets 1e, 1f fitted to a small diameter (left-hand end portion in FIG. 2) of the crankshaft 1 through chains 4a5, 4b5.

Figure 4:
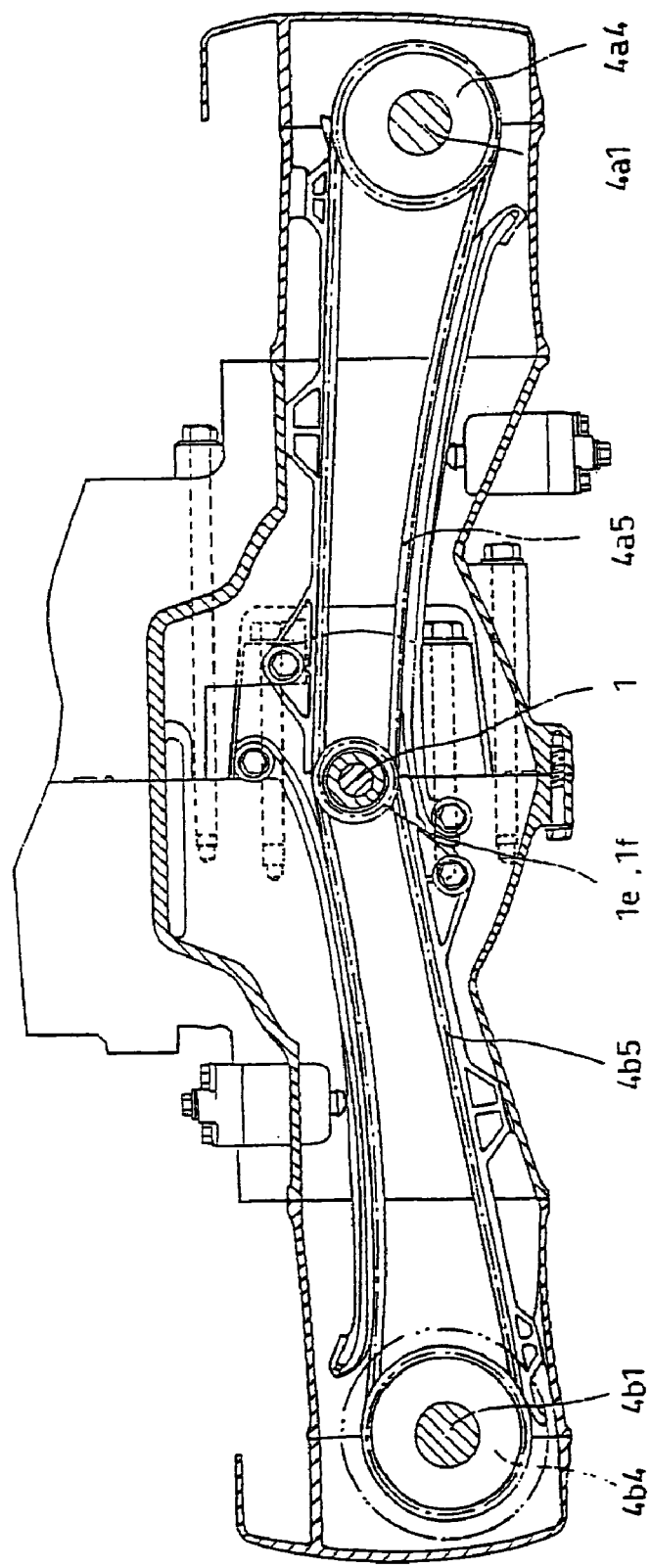
FIG. 4 is a vertical sectional view of an internal combustion engine according to the present invention, and is a sectional view taken along the B—B line in FIG. 2.

Therefore, the interlocking connection between the crankshaft 1 and the camshafts 4a1, 4b1 through the sprockets 1e, 1f and the chains 4a5, 4b5, as a result, achieves a layout structure of the chains 4a5, 4b5 in which the two chains 4a5, 4b5 shown in FIG. 2 and FIG. 4 extend in the horizontally opposite direction with each other across the crankshaft 1. The interlocking connection between the crankshaft 1 and the two camshafts 4a1, 4b1 through the chains 4a5, 4b5 enables the camshafts 4a1, 4b1 to be driven and rotated synchronously with the rotation of the crankshaft 1. The synchronous rotation of the camshafts 4a1, 4b1 with the crankshaft 1 enables the intake and exhaust valves 4a, 4b to open and close at a proper timing by the cams 4a2, 4b2 acting on the tappets 4a3, 4b3.

The internal combustion engine E mounted on the motorcycle A according to the present invention has been outline in the above. As can be seen by referring to the FIG. 2 and FIG. 5, the crankshaft 1 is formed at its rear end, that is, the right-hand end in FIG. 2 (the left-hand end in FIG. 5) with a flanged section 1A and a spindle section 1B where the spindle diameter changes in three steps. To the respective steps of the spindle portion 1B having different diameters, a gear is fitted. Thus, there are fitted three gears 10, 11, 12 altogether. To a spindle section 1B1 which has a large diameter and continues on to the flanged section, a large diameter gear 10 is placed in contact with and fastened to the flanged section 1A with bolts B1. Further, to a spindle section 1B2 which is one step smaller but medium in diameter and continues on to the large diameter spindle section 1B1, a small diameter gear 11 which is formed by means of splines on its inner periphery for coupling with the spindle section 1B2 is fitted.

To a spindle section 1B3 which is one more step smaller in diameter and is located nearest to the end of the spindle, a gear 12 which is narrow in the gear tooth width and has an outer diameter nearly same as the small diameter gear 11 is fitted. The gear 12 with the narrow gear tooth width is indirectly fitted to the small diameter spindle section 1B3 through a one-way clutch 12a. That is, the internal wheel section 12b of the one-way clutch 12a is formed by said gear, and the outer wheel section 12c of the one-way clutch 12a is coupled with the spindle section 1B3 by means of splines 12d formed on the internal periphery of the gear. By such a constitution, the gear 12 with the narrow gear tooth width is fitted to the spindle section 1B3 through the one-way clutch 12a.

Of the three gears 10 through 12, the large diameter gear 10 is a gear for driving accessories such as an alternator 40 which will be described more in detail later, and is made a scissors gear. The small diameter gear 11 on the medium diameter spindle section is a drive gear meshed with a driven gear on a main shaft of a transmission, not shown. Further, the gear 12 with the narrow gear tooth width fitted to the small diameter spindle section 1B3 is a gear meshed with a drive gear for a starter motor, not shown. The scissors gear in this instance should be understood as follows: a mechanism in which a main gear and a sub-gear are overlapped and a phase difference is formed between the gears by applying a scissors load is called a scissors structure. A combination gearing of a main gear and a sub-gear which forms such a scissors structure is called a scissors gear.

Of the three gears 10 through 12, the large diameter gear 10 having the largest diameter is, as described in the above, the gear for driving the alternator 40 which is one of the accessories, and this large diameter gear 10 is meshed with a driven gear 21 fitted mutually rotatably to a drive shaft 20 which essentially serves as a rotor drive section for the alternator 40. The drive shaft 20 on which the driven gear 21 is rotatably supported essentially as described above is a shaft to drive the rotation of a rotor 42 of the alternator 40. The drive shaft 20 is rotatably supported at its both ends by a part of the crankcase 2 through ball bearings 20A, 20B, and its shaft length is relatively short. The drive shaft 20 is a hollow shaft with a lubrication oil supply hole 20a drilled in its axial center. The driven gear 21 is fitted at the right-hand end of the drive shaft 20. A rotor shaft 41 of the alternator 40 is coupled with the left-hand end of the drive shaft 20 by means of splines 20c.

The driven gear is rotatably supported on the drive shaft 20, which is, as described before, hollow, through an insert-fit shaft hole (bearing) 21a over the drive shaft 20. In order to supply lubrication oil to the insert-fit shaft hole 21a, an orifice 20b is drilled in the drive shaft 20. The orifice 20b is communicated with the lubrication oil supply hole 20a of the drive shaft 20, and, through this lubrication oil supply hole 20a, lubrication oil is supplied to the insert-fit bearing between the driven gear 21 and the drive gear 20. To the driven gear 21, a hub 31 of a viscous damper 30, which will be described more in detail later, is more fixedly attached with a plurality of fastening bolts B2 after being loosely inserted over the drive shaft 20.

The hub 31 of the damper 30 which is fixedly attached to the driven gear 21 is joined with a housing 33 of the damper 30 through a viscous coupling means 32. The housing 33 is mounted and fixed in place by having its boss section 33b press-fitted over the alternator drive shaft 20 through its shaft hole 33c, and, at the same time, by having the back of its flange 33d pressed against the flange 20d of the drive shaft 20. Therefore, the rotation of the damper housing 33 causes the drive shaft to rotate as a one unit. The end result is that the rotational driving force of the crankshaft 1 transmitted through the meshing of the large diameter gear 10, which is a gear for driving accessories, on the crankshaft 1 and the driven gear 21 is transmitted through the viscous damper 30 to the drive shaft 20 for the accessories, that is, the alternator 40 and, through the drive shaft 20, to the rotor shaft 41 of the alternator 40, to cause the alternator rotor 42 to rotate.

As can be understood from the meshing of the large diameter gear 10, which is a gear for driving accessories on the crankshaft 1, and the driven gear 21 on the alternator drive gear 20, the rotational direction of the rotor 42 of the alternator 40 is opposite to the rotational direction of the crankshaft 1, and the difference in the rotational directions of the two generates a reaction force against pulsating torque changes in the crankshaft 1 to cancel out and absorb the torque changes. Note that the reference numeral 43 denotes a stator of the alternator 40, and the reference numeral 44 denotes a casing section of the alternator 40.

As can be understood from the fact that the journal bearing supports 20A, 20B for the drive shaft 20 are accomplished by a part of the crankcase 2, the power transmission device for driving accessories is, except for the alternator 40 which is one of accessories, all contained in the crankcase 2. In other words, essentially, all is arranged inside the internal combustion engine E.

Figure 6B:
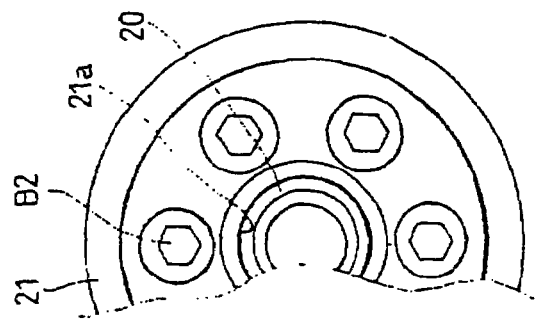
FIG. 6($a$) is a vertical sectional view showing the structure of the viscous damper according to the present invention, and FIG. 6($b$) a view of the gear from the side.

By the way, regarding the viscous damper 30 in the power transmission device for driving accessories, its detailed structure is shown in FIG. 6. Basically, the viscous damper 30 consists of the hub 31, the housing 33, and the viscous coupling means 32 comprising inner plates 31a arranged in the hub 31 and outer plates 33a arranged in the housing 33. The hub 31 is fixedly attached to the driven gear 21 with fastening bolts B2 and comprises: the axially-extending boss section 31b which has the shaft opening 31c and is movably fitted to the drive shaft 20; and an annular protrusion 31e which is larger in diameter than the boss section 31b and extends in the axial direction of the hub 31 opposite to the boss section 31b. The inner periphery of the annular protrusion 31e is essentially made as a recessed section 31d for accommodating the boss section 33b of the housing 33 of the damper 30 (described later) slidably and rotatably in a sealed condition. The inner plates 31a are retained on the outer periphery of the annular protrusion 31e by a means which will be described later.

Incidentally, the housing 33 of the viscous damper 30 consists of:

the boss section 33b which is slidably and rotatably accommodated in a sealed condition in the recessed section 31d of the annular protrusion 31e of the hub 31 comprising the shaft hole 33c that is essentially inserted over and fixedly fitted to the drive shaft 20;

the annular flange 33d formed as a wide inertia weight which extends radially and outwardly one step further from the boss section 33b and extends axially toward the alternator 40 side in the vicinity of its outer periphery to form an annular extension section 33e; and a housing outer ring section 33g which is fitted to an annular stepped portion 33f formed in the outer periphery of the annular flange 33d on the side opposite to the alternator and substantially forms the outer periphery section of the damper 30 along with the flange 33d.

The housing outer ring section 33g is slightly smaller in diameter than the flange 33d.

The housing outer ring section 33g consists of:

an annular axial extension 33g2 which comprises an annular end section 33g1 for fitting to the annular stepped portion 33f in the outer periphery of the annular flange 33d, covers the outer periphery of the annular protrusion 31e of the hub 31 and axially extends to form a surface facing the outer periphery of the annular protrusion 31e; and an inwardly facing annular extension 33g4 which extends downwardly, and faces inwardly, from the annular axial extension 33g2 to form an opening 33g3 in its inner periphery which is fitted over the outer periphery of the boss section 31b of the hub 31.

Therefore, when the housing outer ring section 33g is fitted to the annular stepped portion 33f in the outer periphery of the flange 33d of the housing 33, the structure of the outer periphery of the housing 33 represents approximately a channel shape in a sectional view.

At the time of assembling the hub 31 and the housing 33, a number of plates 31a and 33a which are shaped as donut-like discs are arranged in an annular space 34 formed by the structure of the outer periphery of the housing 33 which represents a channel shape in a sectional view and the outer periphery of the annular protrusion 31e of the hub 31. Additionally, a viscous fluid such as silicon oil and the like is filled therein. A number of plates 31a and 33a are retained respectively on the inner periphery and the outer periphery of the annular space 34, wherein the inner plates 31a are retained on the outer periphery of the annular protrusion 31e of the hub 31 on the inner periphery side, and the outer plates 33a are retained on the inner periphery of the axial extension 33g2 of the housing outer ring 33g on the outer periphery side.

Regarding the retention of these plates 31a, 33a, the retention of the inner plates 31a is accomplished by coupling their internally formed teeth-like protrusions and recesses 31a1 with the outer periphery splines 31f of the annular extension 31e of the hub 31. Additionally, the retention of the outer plates 33a is accomplished by coupling their externally formed teeth-like protrusions and recesses 33a1 with the internal splines 33g5 of the axial extension 33g2 of the housing outer ring 33g. The inner plates 31a and the outer plates 33a are arranged alternately with a clearance set from each other by means of spacer rings R. Any of the plate couplings are made such that the plates 31a, 33a are not allowed to rotate relative to the annular protrusion 31e and the axial extension 33g2 of the outer ring respectively but are allowed to move axially.

The hub 31 and the housing 33 are joined to form a unit in which the hub 31 and the housing 33 are mutually slidable and rotatable while maintaining a sealed condition. Its assembly is performed as follows: first, the opening 33g3 in an inwardly facing annular extension 33g4 of the housing outer ring section 33g is slid and fitted over the outer periphery of the boss section 31b of the hub 31 to join them together and retain them via a seal member 25a such as an O-ring. Next, the outer plates 33a and the inner plates 31a are alternately fitted to the opposing splines 31f, 33g5 respectively in the outer periphery of the annular protrusion 31e of the hub 31 and the inner periphery of the annular axial extension 33g2 of the housing outer ring member 33g with the spacer rings interposed inbetween.

Thereafter, silicon oil is filled therein, and the outer periphery of the boss section 33b which is a part of the housing that consists of only the boss section 33b and the flange 33d which forms a unit with the boss section 33b is slid and fitted into the annular periphery surface of the recessed section 31d of the annular protrusion 31e of the hub 31 via the seal member 25b such as an O-ring. A side of the flange 33d slides and contacts with the end of the annular protrusion 31e of the hub 31, and, at the same time, the end 33g1 of the axial extension 33g2 of the outer ring section 33g of the housing 33 is press-fitted over the outer periphery annular stepped portion 33f of the flange 33d of the housing 33. Thus, the hub 31 and the housing 33 are joined together as a unit with the plates 31a, 33a and the silicon oil interposed and contained therein in such a manner that they are mutually slidable and rotatable while maintaining the sealed condition.

Figure 5:
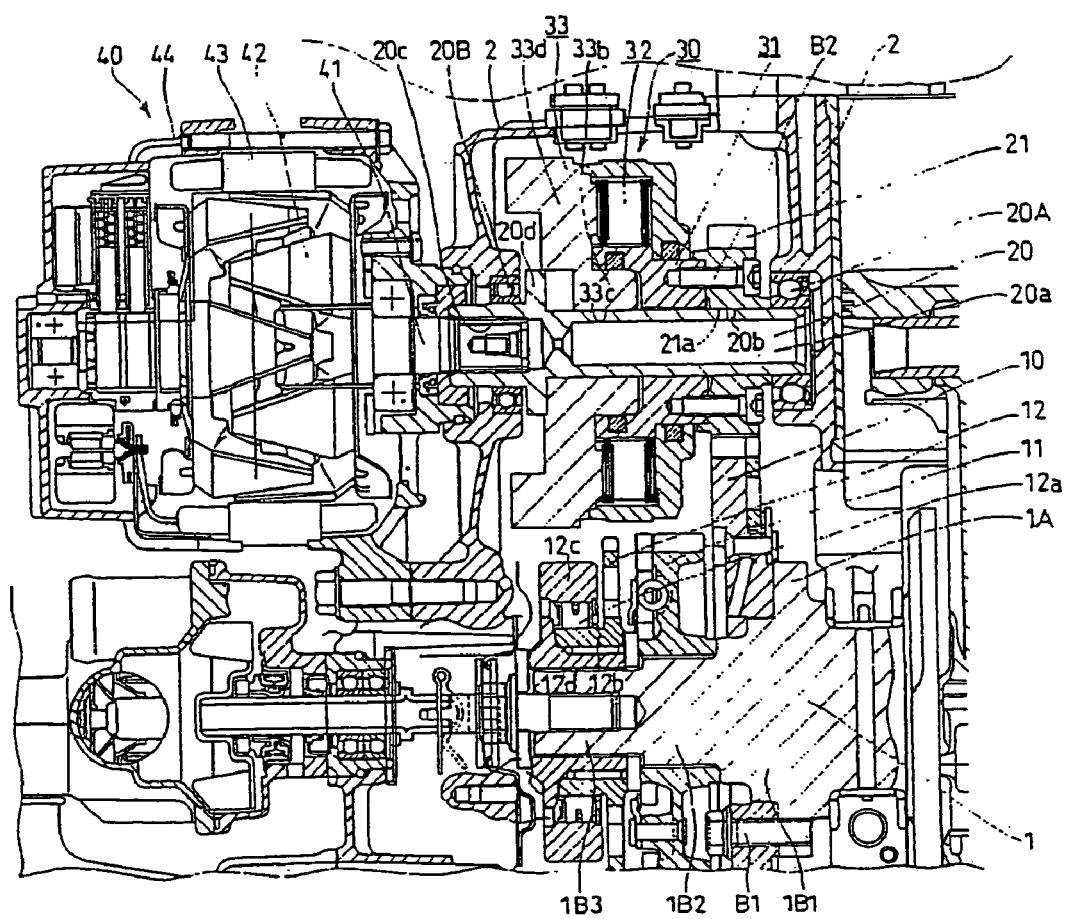
FIG. 5 is a view to show the main structures of the accessory driving device using a viscous damper according to the present invention.
Figure 6A:
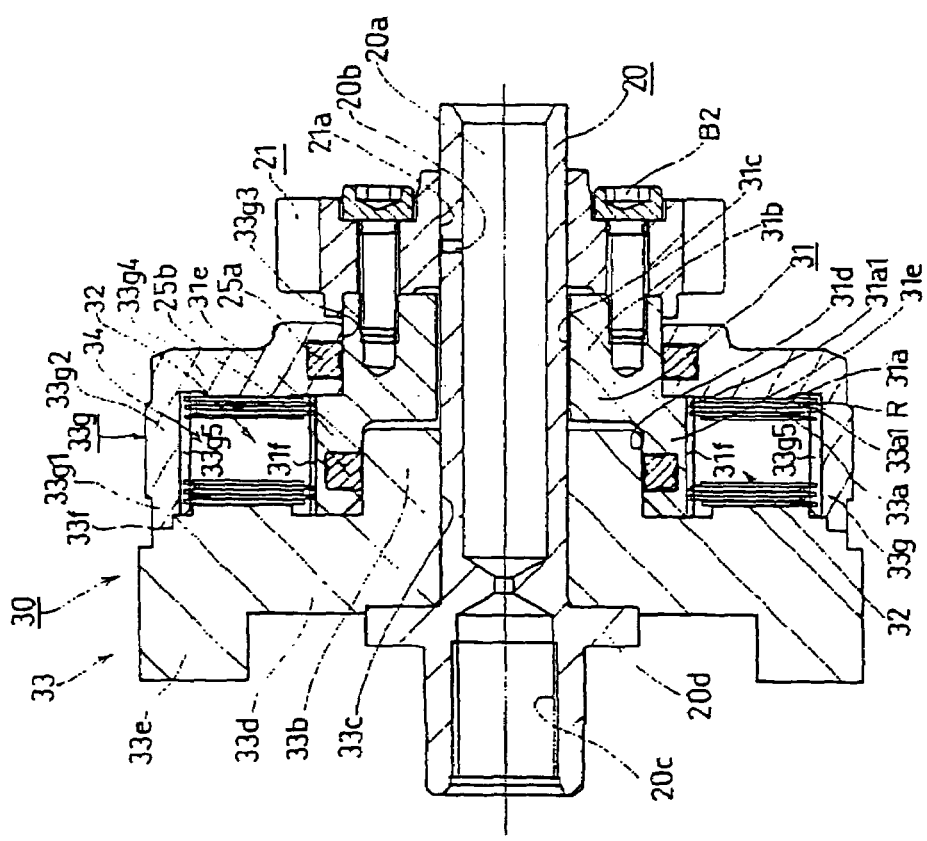
Figure 7B:
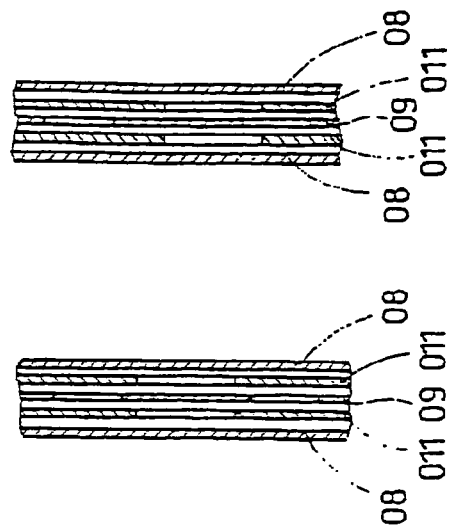
FIG. 7($a$) is a vertical sectional view showing the power transmission device using the conventional viscous damper, and FIG. 7($b$) a view showing the arrangement of the plates.
Figure 7A:
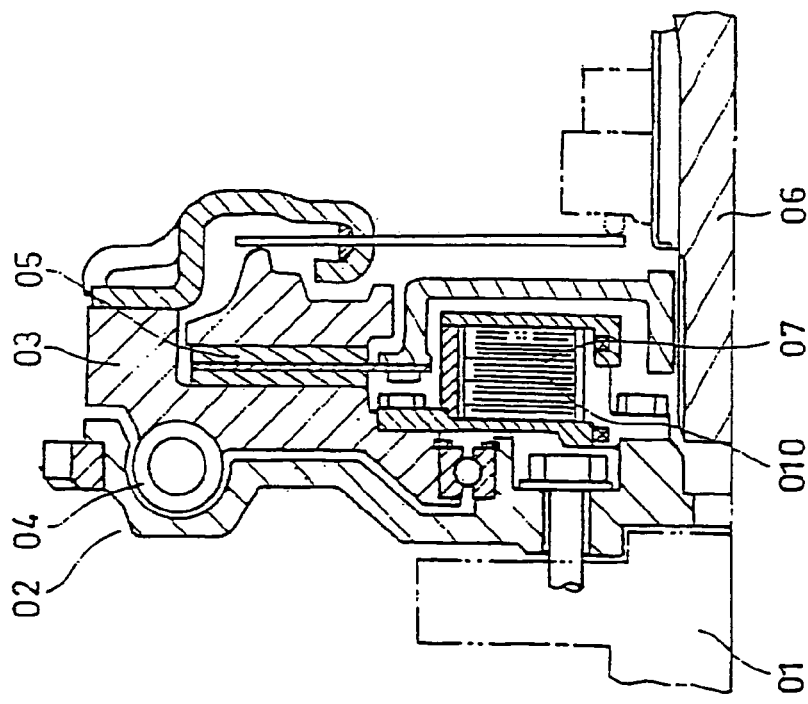

The viscous damper 30 has been described above, and now, the driving operation of aforesaid alternator 40 by the crankshaft 1 through the viscous damper 30 will be briefly described with reference to FIG. 5 and FIGS. 6(a) and (b).

The rotation of the crankshaft 1 in the operation of the well-known internal combustion engine E is transmitted to the driven gear 21 through the meshing between the large diameter gear 10 which is the afore-described gear for driving accessories attached to the shaft end of the crankshaft 1 and the driven gear 21 which is rotatably supported on the drive shaft 20 for the alternator. The rotation of the driven gear 21 is transmitted to the hub 31 of the viscous damper 30 which is fixedly joined with the driven gear 21. As the hub 31 rotates, a number of inner plates 31a rotate, wherein the inner teeth-like recesses and protrusions 31a1 are coupled with the outer splines 31f in the annular protrusion 31e of the hub 31.

The rotation of the inner plates 31a takes place in an annular space 34 enclosed by the damper hub 31 filled with the aforesaid silicon oil and the damper housing 33. The rotation of the inner plates 31a takes place as follows: Each of a number of inner plates 31a is sandwiched by the alternately arranged outer plates 33a with a small clearance with the outer plates 33a. The outer plates 33a, in other words, are such that the outer teeth-like recesses and protrusions 33a1 of which are coupled with the inner splines 33g5 in the axial extension 33g2 of the housing outer ring 33g. Additionally, the silicon oil is filled between the inner plates 31a and the adjacent outer plates 33a. Therefore, the relative rotation of the inner plates 31a and the outer plates 33a shears the silicon oil and generates a viscous torque between the inner plates 31a and the outer plates 33a on account of viscous friction.

The generation of the viscous torque between the inner plates 31a and the outer plates 33a causes an entrained rotation of the outer plates 33a relative to the inner plates 31a which is driven to rotate, and, as the rotational inertia of the damper housing 33 increases, both the inner plates 31a and the outer plates 33a rotate at the same speed. The transmission of the rotational driving force through the viscous damper 30 having the coupling means by a viscous fluid of the silicon oil, i.e., the viscous coupling means 32, effectively dampens and absorbs the vibration and the energy of pulsating torque changes of crankshaft 1 transmitted to the damper hub 31 through the meshing of the gears 10, 21.

That is, since the vibration and the energy of pulsating torque changes of crankshaft 1 are dampened and absorbed by viscous resistance and viscous friction accompanied with the relative movement of the plates 31a, 33a and the silicon oil which constitutes the viscous coupling means 32 of the viscous damper 30, the stable and smooth rotational driving force, aforesaid energy of which has been dampened and absorbed, is transmitted from the damper hub 31 to the damper housing 33. Further, with a combined effect of the inertia of the inertial weight of the flanged section 33d of the damper housing 33, the smooth rotational driving force transmitted to the damper housing 33 is transmitted to the rotor shaft 41 of the alternator 40 through the coupling of the splines 20c of the driving shaft 20 for the alternator which fixedly supports the damper housing 33.

Since the viscous damper 30 does not include a concurrent spring means such as a torsion spring, and essentially consists of the viscous coupling means 32, no resonant phenomenon from the damper 30 is generated. As a result, by using the damper 30, sources of vibration and noise in the power transmission device for driving accessories are reduced, and the design of the power transmission device is facilitated. Further, since the concurrent spring means such as a torsion spring and the like can be omitted, the number of its component parts of the damper 30 as well as the power transmission device using the damper 30 can be reduced and its structure is simplified.

Since the viscous damper 30 is arranged inside the internal combustion engine E, the lubrication of the viscous damper 30 is accomplished by engine oil. Therefore, there is no need to provide a separate lubrication device for the viscous damper 30. Further, since the engine oil works to cool the damper 30, and the interior space of the internal combustion engine E is hard to be affected by the outside air temperature, changes in the damper performance due to the temperature can be controlled.

The viscous damper 30 comprises the housing 33 which transmits the rotational driving force to the alternator 40, which is an accessory unit, and the hub 31 which forms a unit with the driven gear 21 which is arranged on the inner periphery of the housing 33 and transmits the rotational driving force from the crankshaft 1. Therefore, a weight reduction can be accomplished on the damper driving side which is directly connected with the crankshaft 1. As a result, by using the damper 30, since the load acting on the gearing device (10, 21) essentially arranged between the crankshaft 1 and the viscous damper 30 can be reduced, the gear noise can be reduced.

The housing 33 is provided with a weight section which axially extends from the vicinity of the housing outer periphery to form the annular extension 33e, and the housing 33 having the weight section and the rotor 42 of the alternator 40, which is an accessory, driven and coupled with the housing 33 are configured to rotate in a direction opposite to the crankshaft 1. Therefore, the rotational torque change of the crankshaft 1 can be cancelled and controlled by the rotation of the rotor 42 of the alternator 40 by the use of the viscous damper.

The viscous damper used for the power transmission device for driving the alternator according to the present invention can be adapted for driving other accessories other than the alternator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A viscous damper used in a power transmission device for transmitting the rotational driving force of a crankshaft of an internal combustion engine to accessories, comprising:
    a viscous coupling means arranged between the crankshaft and accessories,
    wherein the rotational driving force of the crankshaft is transmitted to the accessories through a viscous fluid in the viscous coupling means
    the viscous damper further comprising:
        a hub; and
        a housing formed with a first part and a second part;
        wherein the first part is sealed against an outer circumferential surface of the hub, and the second part is sealed against an inner circumferential surface of the hub.

2. The viscous damper according to claim 1,
    wherein the viscous damper is arranged inside the internal combustion engine.

3. The viscous damper according to claim 1,
    wherein a gearing is arranged between the crankshaft and the viscous coupling means, and
    wherein the housing transmits the rotational driving force to the accessories and the hub transmits the rotational driving force from the crankshaft.

4. The viscous damper according to claim 2,
    wherein a gearing is arranged between the crankshaft and the viscous coupling means, and
    wherein the housing transmits the rotational driving force to the accessories and the hub transmits the rotational driving force from the crankshaft.

5. The viscous damper according to claim 3,
    wherein the housing is provided with a weight section which is an annular extension section axially protruding in the vicinity of its outer periphery, and
    wherein the housing rotates along with the accessories in a direction opposite to the rotation of the crankshaft.

6. The viscous damper according to claim 3, wherein the first part of the housing includes:
    a boss section which is slidably and rotatably accommodated in a sealed condition in a recessed section of the hub; and
    an annular flange formed as a wide inertia weight which extends radially and outwardly one step further from the boss section and extends axially toward the accessories in the vicinity of its outer periphery to form an annular extension section,
    wherein the second part of the housing is a housing outer ring section which is fitted to an annular stepped portion formed in an outer periphery of the annular flange on the side opposite to the accessories and substantially forms an outer periphery section of the damper along with the annular flange.

7. The viscous damper according to claim 6, wherein the housing outer ring section includes:
    an annular axial extension which comprises an annular end section for fitting to the annular stepped portionin the outer periphery of the annular flange and covers an outer periphery of an annular protrusion of the hub; and
    an inwardly facing annular extension which extends downwardly, and faces inwardly.

8. The viscous damper according to claim 1, wherein the rotational driving force of the crankshaft is transmitted to the hub through a meshing of a large diameter gear and a driven gear, the viscous damper forming a unit with the driven gear.

9. The viscous damper according to claim 8, wherein the hub is fixedly attached to the driven gear.

10. The viscous damper according to claim 1, further comprising:
    a drive shaft for rotating the accessories on which a driven gear is rotatably supported,
    the drive shaft being rotatably supported at both ends thereof by a part of a crankcase.

11. A viscous damper used in a power transmission device for transmitting the rotational driving force of a crankshaft of an internal combustion engine to an alternator, comprising:
    a viscous coupling means arranged between the crankshaft and the; and
    a gearing arranged between the crankshaft and the viscous coupling means,
    wherein the rotational driving force of the crankshaft is transmitted to the alternator through a viscous fluid in the viscous coupling means,
    the viscous damper further comprising:
    a housing formed with a first part and a second part between which the viscous coupling means is disposed,
    the first part including an outermost diameter that is larger than that of the second part, and a weight section which is an annular extension section axially protruding in the vicinity of its outer periphery,
    wherein the housing transmits the rotational driving force to the alternator and a hub disposed on the inner peripheral side of the second part of the housing transmits the rotational driving force from the crankshaft, the housing rotating along with the alternator in a direction opposite to the rotation of the crankshaft.

12. The viscous damper according to claim 11, wherein the viscous damper is arranged inside the internal combustion engine.

13. The viscous damper according to claim 11, wherein the rotational driving force of the crankshaft is transmitted to the hub through a meshing of a large diameter gear and a driven gear, the viscous damper forming a unit with the driven gear.

14. The viscous damper according to claim 13, wherein the hub is fixedly attached to the driven gear.

15. The viscous damper according to claim 11, further comprising
a drive shaft is adapted to rotate the alternator on which a driven gear is rotatably supported, the drive shaft being rotatably supported at both ends thereof by a part of a crankcase.

16. A viscous damper used in a power transmission device for transmitting the rotational driving force of a crankshaft of an internal combustion engine to an alternator, comprising:
a viscous coupling means arranged between the crankshaft and the alternator; and a gearing arranged between the crankshaft and the viscous coupling means,
wherein the rotational driving force of the crankshaft is transmitted to the alternator through a viscous fluid in the viscous coupling means,
the viscous damper further comprising:
a housing formed with a first part and a second part between which the viscous coupling means is disposed the first part including an outermost diameter that is larger than that of the second part,
wherein the first part of the housing includes a boss section which is slidably and rotatably accommodated in a sealed condition in a recessed section of a hub; and an annular flange formed as a wide inertia weight which extends radially and outwardly one step further from the boss section and extends axially toward the alternator in the vicinity of its outer periphery to form an annular extension section,
wherein the second part of the housing is a housing outer ring section which is fitted to an annular stepped portion formed in an outer periphery of the annular flange on the side opposite to the alternator and substantially forms an outer periphery section of the damper along with the annular flange,
wherein the housing transmits the rotational driving force to the alternator and the hub is disposed on the inner peripheral side of the second part of the housing and transmits the rotational driving force from the crankshaft.

17. The viscous damper according claim 16, wherein the housing outer ring section includes:
an annular axial extension which comprises an annular end section for fitting to the annular stepped portion in the outer periphery of the annular flange and covers an outer periphery of an annular protrusion of the hub; and
an inwardly facing annular extension which extends downwardly, and faces inwardly.

* * * * *